(12) United States Patent
Akiyama

(10) Patent No.: US 10,108,076 B2
(45) Date of Patent: Oct. 23, 2018

(54) LIGHT SOURCE APPARATUS AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/494,677

(22) Filed: Apr. 24, 2017

(65) Prior Publication Data

US 2017/0329212 A1  Nov. 16, 2017

(30) Foreign Application Priority Data

May 10, 2016 (JP) .................................. 2016-094521

(51) Int. Cl.
*G03B 21/20* (2006.01)
*G03B 21/00* (2006.01)

(52) U.S. Cl.
CPC ......... *G03B 21/204* (2013.01); *G03B 21/005* (2013.01); *G03B 21/208* (2013.01); *G03B 21/2013* (2013.01); *G03B 21/2066* (2013.01); *G03B 21/2073* (2013.01)

(58) Field of Classification Search
CPC .. G03B 21/005; G03B 21/204; G03B 21/208; G03B 21/2013; G03B 21/2066; G03B 21/2073
USPC ............................................. 353/20, 31, 85
See application file for complete search history.

(56) References Cited

U.S. PATENT DOCUMENTS

| 2012/0140183 | A1 | 6/2012 | Tanaka et al. | |
| 2013/0194552 | A1 | 8/2013 | Matsubara et al. | |
| 2015/0153020 | A1* | 6/2015 | Akiyama | G03B 21/2073 353/20 |
| 2016/0077419 | A1* | 3/2016 | Sheng | G03B 21/2073 353/20 |

FOREIGN PATENT DOCUMENTS

| JP | 2012-137744 A | 7/2012 |
| WO | 2012-053057 A1 | 4/2012 |

* cited by examiner

*Primary Examiner* — Steven H Whitesell Gordon
*Assistant Examiner* — Jerry Brooks
(74) *Attorney, Agent, or Firm* — Oliff PLC

(57) ABSTRACT

A light source apparatus includes a light source section having a first area and a second area, a first condensing optical system, a second condensing optical system, a wavelength conversion element, a reflection element, and a wavelength selective polarization element. The first area and the second area respectively emit a first light ray flux and a second light ray flux. The first light ray flux passes through the first condensing optical system to excite the wavelength conversion element. The excited wavelength conversion element emits fluorescence. The second light ray flux passes through the wavelength selective polarization element and the second condensing optical system to enter the reflection element. The wavelength selective polarization element transmits the fluorescence irrespective of the polarization state of the fluorescence to combine the second light ray flux reflected by the reflection element with the fluorescence.

7 Claims, 4 Drawing Sheets

LIGHT SOURCE APPARATUS AND PROJECTOR

BACKGROUND

1. Technical Field

The present invention relates to a light source apparatus and a projector.

2. Related Art

In recent years, as a light source of a light source apparatus used in a projector, a semiconductor laser, which provides high-luminance, high-intensity light, has received attention. When the number of semiconductor lasers is increased to increase the luminance of a light flux from a projector, the width of the light flux increases accordingly, undesirably resulting in an increase in the diameter of a condenser lens. The increase in the size of the condenser lens undesirably leads to an increase in the size of the light source apparatus and an increase in material cost.

In view of the fact described above, for example, JP-A-2012-137744 discloses a light source apparatus that is used for a projector and includes an array light source having a plurality of semiconductor lasers arranged two-dimensionally and an afocal system that is formed of a convex lens and a concave lens and adjusts the width of the light ray flux emitted from the array light source.

When the semiconductor lasers are mounted, alignment thereof could vary (mounting error could occur) to some extent. The afocal system described above, when it has a greater reduction factor, tends to be affected by a greater amount by the mounting error.

SUMMARY

An advantage of some aspects of the invention is to provide a light source apparatus and a projector capable of reducing the width of a light ray flux with no use of an afocal system having a large reduction factor to avoid an increase in the size of a condenser lens.

A first aspect of the invention provides a light source apparatus including a light source section including a plurality of light emitting devices and having a first area that outputs a first light ray flux and a second area that outputs a second light ray flux, a wavelength separation element, a first condensing optical system, and a wavelength conversion element provided sequentially from the side where the light source section is present on an optical path of the first light ray flux, and a wavelength selective polarization element, a first retardation element, a second condensing optical system, and a reflection element provided sequentially from the side where the light source section is present on an optical path of the second light ray flux. The second light ray flux reflected by the reflection element passes through the second condensing optical system and the first retardation element in an order thereof and is reflected by the wavelength selective polarization element. Fluorescence emitted from the wavelength conversion element enters the first condensing optical system, the wavelength separation element, and the wavelength selective polarization element in an order thereof. The wavelength selective polarization element transmits the fluorescence irrespective of a polarization state of the fluorescence.

In the light source apparatus according to the first aspect, a light exiting area of the light source section is divided into two areas. One of the light ray fluxes (first light ray flux) can be guided through the first condensing optical system to the wavelength conversion element, and the other light ray flux (second light ray flux) can be guided through the second condensing optical system to the reflection element. Since the width of the first light ray flux incident on the first condensing optical system and the width of the second light ray flux incident on the second condensing optical system are smaller than the width of the light ray flux that is the combination of the first light ray flux and the second light ray flux, lenses each having a small effective diameter can be employed as each of the first condensing optical system and the second condensing optical system. The first condensing optical system and the second condensing optical system can therefore be reduced in size.

In the first aspect, it is preferable that the second light ray flux contains an excitation component reflected by the wavelength selective polarization element toward the wavelength separation element, and that the wavelength separation element further has a polarization separation function for light in a wavelength band which corresponds to the first light ray flux, and combines the first light ray flux with the excitation component reflected by the wavelength selective polarization element.

According to this configuration, part of the second light ray flux can be used as excitation light that excites the wavelength conversion element.

In the first aspect, it is preferable that the light source apparatus further includes a second retardation element provided on an optical path of the second light ray flux between the light source section and the wavelength selective polarization element, and that a direction of an optic axis of the second retardation element is changeable.

According to this configuration, appropriately setting the angle of rotation of the second retardation film allows the polarization state of the second light ray flux to be changed. The proportion of the excitation component in the second light ray flux can therefore be adjusted. Since the ratio between the light having been reflected by the reflection element and further reflected by the wavelength selective polarization element and the fluorescence having passed through the wavelength selective polarization element depends on the proportion of the excitation component, adjusting the angle of rotation allows adjustment of the color temperature of the light outputted from the light source apparatus.

A second aspect of the invention provides a projector including the light source apparatus according to the first aspect, a light modulator that modulates light from the light source apparatus in accordance with image information to form image light, and a projection system that projects the image light.

The projector according to the second aspect can be reduced in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
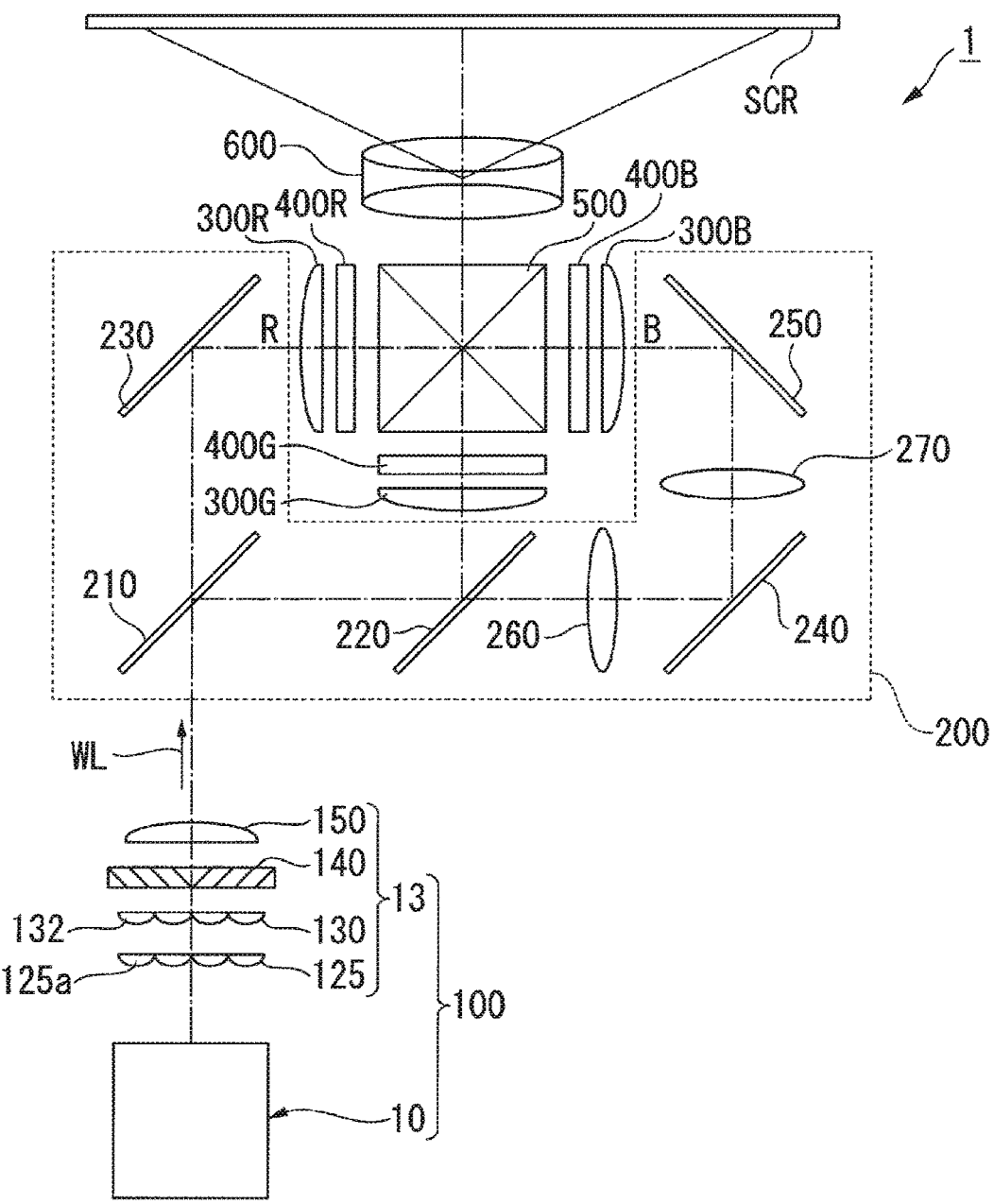
FIG. 1 shows a schematic configuration of a projector according to a first embodiment.

Embodiments of the invention will be described below in detail with reference to the drawings. In the drawings used in the following description, a characteristic portion is enlarged for convenience in some cases for clarity of the characteristic thereof, and the dimension ratio and other factors of each component are therefore not always equal to actual values.

First Embodiment

Projector

A projector according to the present embodiment will first be described. FIG. 1 shows a schematic configuration of a projector 1 according to the present embodiment.

The projector 1 includes an illuminator 100, a color separation/light guiding system 200, light modulators 400R, 400G, and 400B, a cross dichroic prism 500, and a projection system 600, as shown in FIG. 1.

In the present embodiment, the illuminator 100 outputs white illumination light WL toward the color separation/light guiding system 200. The illuminator 100 includes a light source apparatus 10 and a homogenizing illumination system 13.

The color separation/light guiding system 200 includes dichroic mirrors 210 and 220, reflection mirrors 230, 240, and 250, and relay lenses 260 and 270. The color separation/light guiding system 200 separates the light from the illuminator 100 into red light, green light, and blue light and guides the red light, the green light, and the blue light to the light modulators 400R, 400G, and 400B corresponding thereto.

Condenser lenses 300R, 300G, and 300B are disposed between the color separation/light guiding system 200 and the light modulators 400R, 400G, 400B, respectively.

The dichroic mirror 210 is a dichroic mirror that transmits a red light component and reflects a green light component and a blue light component.

The dichroic mirror 220 is a dichroic mirror that reflects the green light component and transmits the blue light component.

The reflection mirror 230 is a reflection mirror that reflects the red light component.

The reflection mirrors 240 and 250 are reflection mirrors that reflect the blue light component.

The light modulators 400R, 400G, and 400B modulate color light beams incident thereon in accordance with image information to form a color image. Although not shown, light-incident-side polarizers are disposed between the condenser lenses 300R, 300G, 300B and the light modulators 400R, 400G, 400B, and light-exiting-side polarizers are disposed between the light modulators 400R, 400G, 400B and the cross dichroic prism 500.

The cross dichroic prism 500 combines image light beams outputted from the light modulators 400R, 400G, and 400B to form a color image.

The cross dichroic prism 500 is formed by bonding four rectangular prisms and thus has a roughly square shape when viewed in a plan view, and dielectric multilayer films are formed along the roughly X-shaped interfaces between the bonded rectangular prisms.

The color image having exited out of the cross dichroic prism 500 is enlarged and projected by the projection system 600 on a screen SCR.

Light Source Apparatus

The configuration of the light source apparatus 10 described above will next be described.

Figure 2:
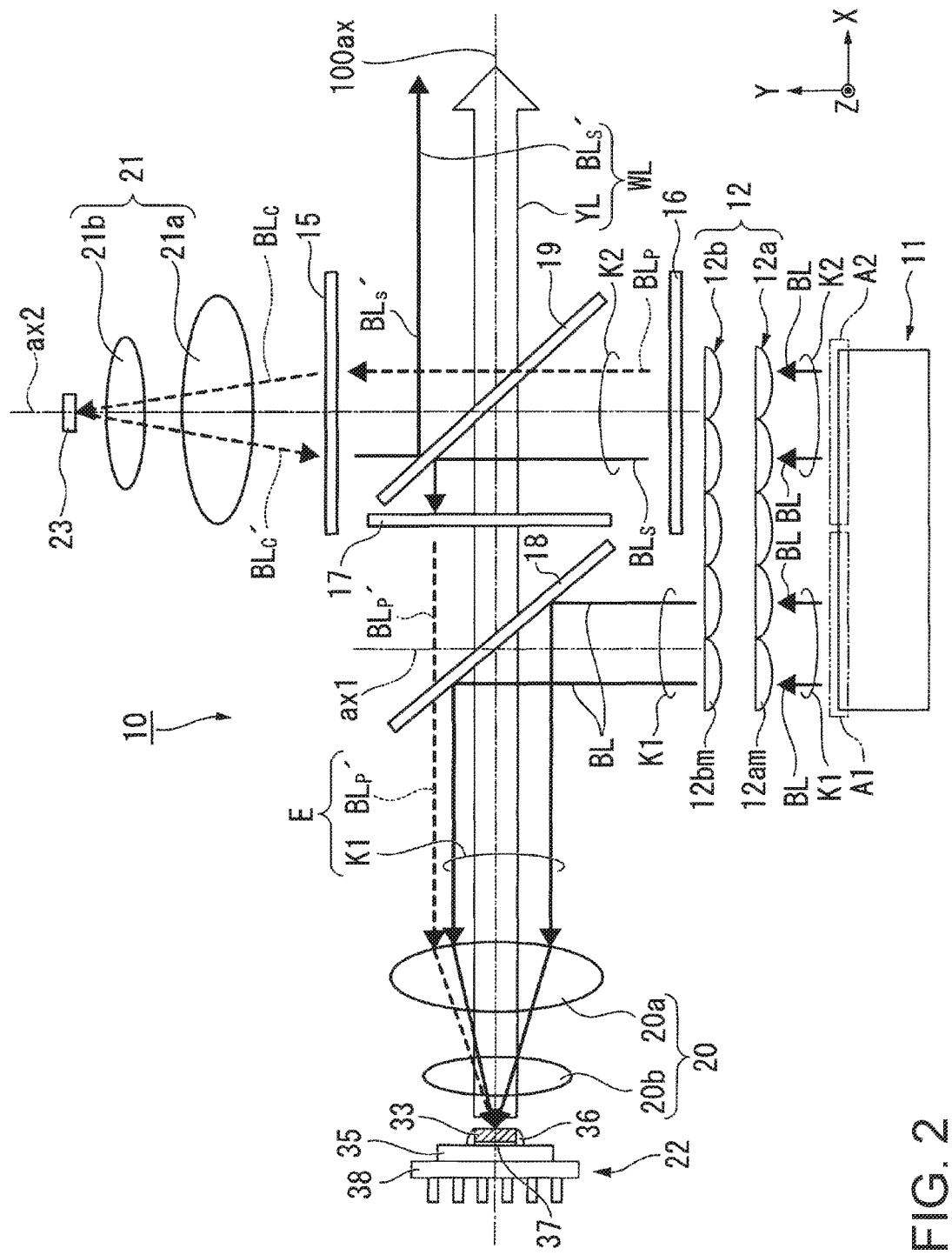
FIG. 2 shows a schematic configuration of a light source apparatus.

FIG. 2 shows a schematic configuration of the light source apparatus 10.

The light source apparatus 10 includes a light source section 11, a homogenizer system 12, a first retardation film 15, a second retardation film 16, a third retardation film 17, a first polarization separation element 18, a second polarization separation element 19, a first condensing optical system 20, a second condensing optical system 21, a phosphor element 22, and a diffusive reflection element 23, as shown in FIG. 2.

In the present embodiment, the first polarization separation element 18 corresponds to the "wavelength separation element" in the appended claims. The second polarization separation element 19 corresponds to the "wavelength selective polarization element" in the appended claims. The phosphor element 22 corresponds to the "wavelength conversion element" in the appended claims. The diffusive reflection element 23 corresponds to the "reflection element" in the appended claims. The first retardation film 15 corresponds to the "first retardation element" in the appended claims. The second retardation film 16 corresponds to the "second retardation element" in the appended claims.

In the present embodiment, the light source section 11 has a first area A1, which emits a first light ray flux K1, and a second area A2, which emits a second light ray flux K2. In FIG. 2, reference character ax1 denotes the optical axis in the first area A1, and reference character ax2 denotes the optical axis in the second area A2. The optical axis a1 coincides with the principal ray of the first light ray flux K1. The optical axis a2 coincides with the principal ray of the second light ray flux K2.

The following description will be made by using an XYZ coordinate system in the drawings in some cases. In FIG. 2, the direction X is the direction parallel to an illumination optical axis 100ax of the light source apparatus 10, the direction Y is the direction parallel to the optical axes ax1 and ax2 of the light source section 11, and the direction Z is the direction perpendicular to the directions X and Y.

The first area A1 of the light source section 11, the homogenizer system 12, the first polarization separation element 18, the first condensing optical system 20, and the phosphor element 22 are sequentially provided on the optical path of the principal ray of the first light ray flux K1.

The second area A2 of the light source section 11, the homogenizer system 12, the second retardation film 16, the first retardation film 15, the second condensing optical system 21, and the diffusive reflection element 23 are sequentially arranged on the optical path of the principal ray of the second light ray flux K2.

The phosphor element 22, the first condensing optical system 20, the first polarization separation element 18, the third retardation film 17, and the second polarization separation element 19 are sequentially arranged on the illumination optical axis 100ax. The optical axes ax1 and ax2 and the illumination optical axis 100ax are present in the same plane. The optical axes ax1 and ax2 are perpendicular to the illumination optical axis 100ax.

Figure 3:
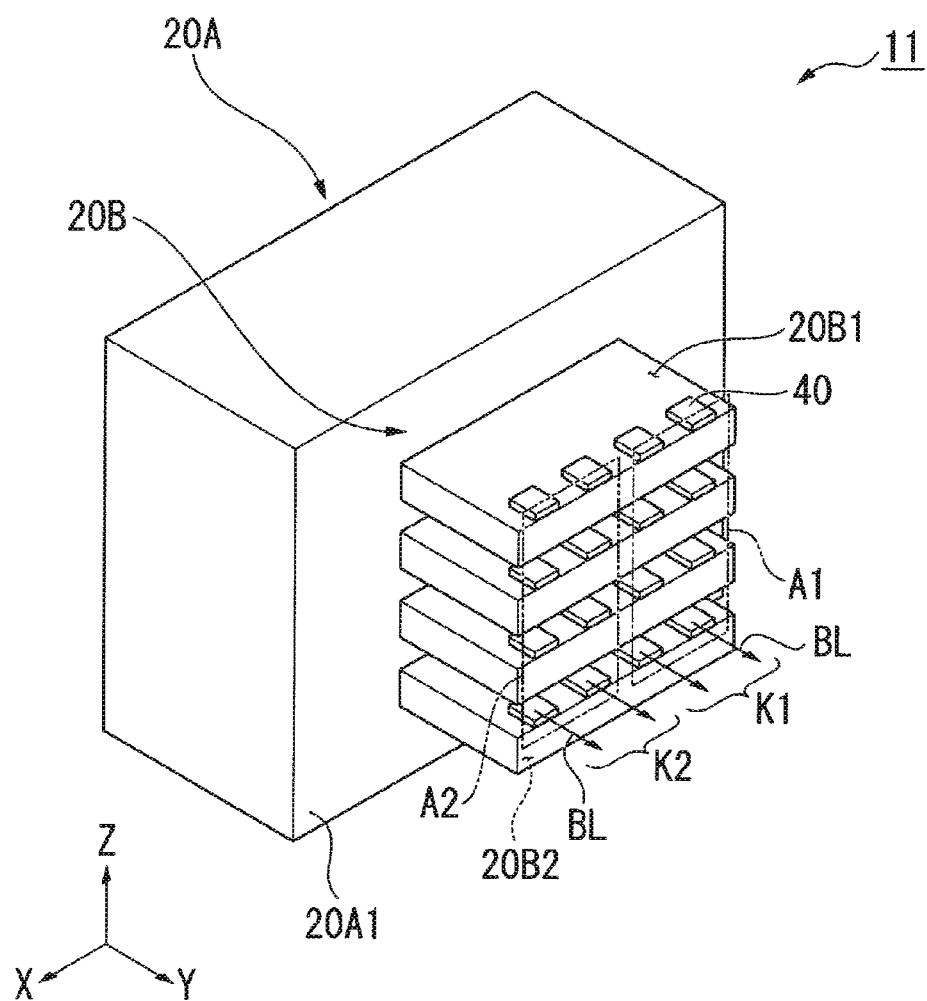
FIG. 3 is a perspective view showing a schematic configuration of a light source section.

FIG. 3 is a perspective view showing a schematic configuration of the light source section 11. The light source section 11 includes a plurality of light emitters 40. Each of the light emitters 40 corresponds to the "light emitting device" in the appended claims.

The light source section 11 includes a main body 20A, a plurality of support members 20B, and the plurality of light emitters 40 supported by the support members 20B, as shown in FIG. 3.

The plurality of support members 20B are attached to a side surface 20A1 of the main body 20A. The support members 20B are disposed at equal intervals in the upward/downward direction of the side surface 20A1.

The main body 20A, along with the support members 20B, functions as a heatsink that dissipates heat generated by the light emitters 40.

Each of the support members 20B is a plate-shaped member and has an upper surface 20B1. Each of the upper surfaces 20B1 has a roughly rectangular shape in a plan view and has long sides and short sides in the directions X and Y, respectively. The upper surfaces 20B1 are parallel to the XY plane.

In the present embodiment, each of the plurality of light emitters 40 is formed of a semiconductor laser. The plurality of light emitters 40 are mounted one dimensionally in the direction X on the upper surfaces 20B1 of the support members 20B. Each of the light emitters 40 emits a light ray BL formed of a blue (light emission intensity peaks at about 445 nm) light beam.

The light source section 11 outputs the first light ray flux K1 and the second light ray flux K2. The first light ray flux K1 is formed of a plurality of light rays BL emitted from the plurality of light emitters 40 arranged in the first area A1. The second light ray flux K2 is formed of a plurality of light rays BL emitted from the plurality of light emitters 40 arranged in the second area A2. The wavelength band of the first light ray flux K1 is the same as the wavelength band of the second light ray flux K2.

Further, the first light ray flux K1 and the second light ray flux K2 have the same light flux width. The amount of the first light ray flux K1 and the amount of the second light ray flux K2 each correspond to 50% of the overall amount of light outputted from the light source section 11.

In the present embodiment, the first light ray flux K1 corresponds to the "first light ray flux" in the appended claims, and the second light ray flux K2 corresponds to the "second light ray flux" in the appended claims.

Each of the light emitters 40 can instead be a semiconductor laser that emits blue light having a wavelength other than 445 nm (460 nm, for example). In FIG. 3, only the light rays BL emitted from the light emitters 40 arranged on the lowest support member 20B are shown for convenience.

In the present embodiment, the plurality of light emitters 40 are so mounted on the upper surfaces 20B1 that a principal ray BLa of the light ray BL emitted from each of the light emitters 40 is parallel to the direction Y. Further, the slow axis direction of each of the light emitters 40 is parallel to the direction X, and the fast axis direction thereof is parallel to the direction Z.

The light ray BL emitted from one of the light emitters 40 is parallelized by a pair of cylindrical lenses that are not shown. The light ray BL is first parallelized by the front one of the pair of cylindrical lenses in the fast axis direction and then parallelized by the rear cylindrical lens in the slow axis direction. As a result, the light ray BL has a roughly circular cross-sectional shape. The pair of cylindrical lenses form a collimation system.

The first light ray flux K1 and the second light ray flux K2 are incident on the homogenizer system 12. The homogenizer system 12 includes a fly-eye lens 12a and a fly-eye lens 12b.

The first light ray flux K1 having passed through the homogenizer system 12 is incident on the first polarization separation element 18. The first polarization separation element 18 is formed of a polarization separation element having wavelength selectivity. Specifically, the first polarization separation element 18 has a polarization separation function for light (blue light) in the wavelength band which corresponds to the first light ray flux K1. In addition, the first polarization separation element 18 has a color separation function of transmitting fluorescence YL of a wavelength band different from the wavelength band which corresponds to the first light ray flux K1, irrespective of the polarization state of the fluorescence YL.

In the present embodiment, each of the light rays BL that form the first light ray flux K1 is linearly polarized light (S-polarized component with respect to first polarization separation element 18). The first light ray flux K1 is therefore reflected by the first polarization separation element 18 and travels toward the phosphor element 22. The first polarization separation element 18 transmits a light ray flux BLp' having reflected off the second polarization separation element 19, and then having passed through the third retardation film 17 to be P-polarized component, as will be described later. The light ray flux BLp' having passed through the first polarization separation element 18 is combined with the first light ray flux K1 reflected by the first polarization separation element 18 into excitation light E.

The excitation light E enters the first condensing optical system 20. The first condensing optical system 20 collects the excitation light E and directs the collected excitation light E toward a phosphor layer 33 of the phosphor element 22. In the present embodiment, the phosphor layer 33 of the phosphor element 22 is disposed at the focal point of the first condensing optical system 20.

The first condensing optical system 20 cooperates with the homogenizer system 12 to homogenize the illuminance distribution of the excitation light E on the phosphor layer 33. The first condensing optical system 20 is formed, for example, of pickup lenses 20a and 20b.

The phosphor element 22 includes the phosphor layer 33, a substrate 35, which supports the phosphor layer 33, and a fixing member 36, which fixes the phosphor layer 33 to the substrate 35.

The phosphor layer 33 contains phosphor particles that absorb the excitation light E, convert the excitation light E into the yellow fluorescence YL, and output the fluorescence YL. The phosphor particles can, for example, be a YAG-based (yttrium-aluminum-garnet-based) phosphor. The phosphor particles may be made of one type of material, or combination of particles made of two or more types of materials may be used as the phosphor particles.

A heatsink 38 is disposed on a surface of the substrate 35 opposite to the surface that supports the phosphor layer 33.

A reflector 37 is provided between the phosphor layer 33 and the substrate 35. Part of the fluorescence YL produced by the phosphor layer 33 is reflected by the reflector 37, is directed toward the first condensing optical system 20, and exits out of the phosphor layer 33. The other part of the fluorescence YL produced by the phosphor layer 33 does not travel via the reflector 37 but directly exits out of the phosphor layer 33. The fluorescence YL thus exits out of the phosphor layer 33 toward the first condensing optical system 20.

The fluorescence YL outputted from the phosphor layer 33 passes through the first condensing optical system 20, the first polarization separation element 18, and the third retardation film 17.

The second light ray flux K2 having passed through the homogenizer system 12 enters the second retardation film 16.

The second retardation film 16 is, for example, a half-wave plate rotatable around the Y axis. Changing the angle of rotation of the second retardation film 16 changes the direction of the optic axis of the second retardation film 16.

In the present embodiment, each of the light rays BL that form the second light ray flux K2 is linearly polarized light. The second light ray flux K2 having passed through the second retardation film 16 contains the S-polarized component with respect to the second polarization separation element 19 (hereinafter referred to as light ray flux BLs) and the P-polarized component with respect to the second polarization separation element 19 (hereinafter referred to as light ray flux BLp) with a ratio of a predetermined value. Appropriately setting the angle of rotation of the second retardation film 16 allows the ratio between the S-polarized component and the P-polarized component in the second light ray flux K2 to be changed.

The second polarization separation element 19 is formed of a polarization separation element having wavelength selectivity. Specifically, the second polarization separation element 19 has a polarization separation function for light (blue light) in the wavelength band which corresponds to the second light ray flux K2. In addition, the second polarization separation element 19 has a color separation function of transmitting the fluorescence YL of the wavelength band different from the wavelength band which corresponds to the first light ray flux K1, irrespective of the polarization state of the fluorescence YL.

The light ray flux BLp passes through the second polarization separation element 19 and travels toward the diffusive reflection element 23. The light ray flux BLs reflects off the second polarization separation element 19 and travels toward the phosphor element 22. That is, the light ray flux BLs is used to excite the phosphor layer 33.

The light ray flux BLs reflected by the second polarization separation element 19 is incident on the third retardation film 17. The third retardation film 17 is formed of a half-wave plate (λ/2 plate) disposed on the optical path between the second polarization separation element 19 and the first polarization separation element 18. The light ray flux BLs, when passing through the third retardation film 17, is converted into a light ray flux BLp', which is P-polarized light with respect to the first polarization separation element 18.

The light ray flux BLp' formed of the P-polarized component passes through the first polarization separation element 18 and is combined with the first light ray flux K1 formed of the S-polarized component reflected by the first polarization separation element 18 into the excitation light E described above. The excitation light E enters the phosphor element 22 through the first condensing optical system 20, as described above.

The light ray flux BLp having passed through the second polarization separation element 19 is incident on the first retardation film 15. The first retardation film 15 is formed of a quarter-wave plate (λ/4 plate) disposed on the optical path between the second polarization separation element 19 and the diffusive reflection element 23. The light ray flux BLp, when passing through the first retardation film 15, is converted into a circularly polarized light ray flux BLc. The light ray flux BLc having passed through the first retardation film 15 is incident on the second condensing optical system 21.

The second condensing optical system 21 collects the light ray flux BLc and directs the collected light ray flux BLc toward the diffusive reflection element 23. The second condensing optical system 21 is formed, for example, of pickup lenses 21a and 21b. The second condensing optical system 21 cooperates with the homogenizer system 12 to homogenize the illuminance distribution of the light ray flux BLc on the diffusive reflection element 23. In the present embodiment, the diffusive reflection element 23 is disposed at the focal point of the second condensing optical system 21.

The diffusive reflection element 23 diffuses and reflects the light ray flux BLc having exited out of the second condensing optical system 21 toward the second polarization separation element 19. The light reflected by the diffusive reflection element 23 is referred to as a light ray flux BLc'. The diffusive reflection element 23 preferably reflects the light ray flux BLc incident thereon in a fashion of Lambertian reflection.

The diffusive reflection element 23 is, for example, a diffusive reflection plate formed of a light reflective member on which irregularities are formed. The circularly polarized light ray flux BLc' having reflected off the diffusive reflection element 23 and having passed through the second condensing optical system 21 again passes through the first retardation film 15 again, which converts the circularly polarized light ray flux BLc' into an S-polarized light ray flux BLs'. The S-polarized light ray flux BLs' (blue light) is reflected by the second polarization separation element 19 and combined with the fluorescence YL having passed through the second polarization separation element 19 into the white illumination light WL.

The thus produced white illumination light WL is incident on the homogenizing illumination system 13.

In the present embodiment, the white illumination light WL is produced, for example, by causing 20% of the overall amount of light outputted from the light source section 11 to be incident on the diffusive reflection element 23 and 80% of the light to be incident on the phosphor element 22. The second light ray flux K2, however, corresponds to 50% of the overall amount of light outputted from the light source section 11, as described above. In view of the fact described above, the angle of rotation of the second retardation film 16 is so set that the ratio between the light ray flux BLs and the light ray flux BLp in the second light ray flux K2 having passed through the second retardation film 16 is 6:4. As a result, the white illumination light WL can be produced in a satisfactory manner.

Since the ratio between the light BLs' having been reflected by the second polarization separation element 19 and the fluorescence YL having passed through the second polarization separation element 19 depends on the ratio between the light ray flux BLs and the light ray flux BLp, adjusting the angle of rotation of the second retardation film 16 allows adjustment of the color temperature of the illumination light WL.

In the light source apparatus 10 according to the present embodiment, the light exiting area of the light source section 11 is divided into two areas having the same size (first area A1 and second area A2). One of the light ray fluxes (first light ray flux K1) is guided through the first condensing optical system 20 to the phosphor element 22, and the other light ray flux (second light ray flux K2) is guided through the second condensing optical system 21 to the diffusive reflection element 23.

According to the configuration described above, since the width of the first light ray flux K1 incident on the first condensing optical system 20 and the width of the second light ray flux K2 incident on the second condensing optical system 21 are smaller than the width of the light ray flux that is the combination of the first light ray flux K1 and the second light ray flux K2, lenses each having a small effective diameter can be employed as each of the first condensing optical system 20 and the second condensing optical system 21. The first condensing optical system 20 and the second condensing optical system 21 can therefore be reduced in size. Further, the light source apparatus 10 including the first condensing optical system 20 and the second condensing optical system 21 can be reduced in size.

Further, in the present embodiment, since the first light ray flux K1 and the second light ray flux K2 have the same light flux width, the first condensing optical system 20 and the second condensing optical system 21 can each be an optical system having the same size. Cost reduction can therefore achieved as compared with a case where optical systems having different sizes are used as the first condensing optical system 20 and the second condensing optical system 21.

In the case where the multiple light emitters 40 (semiconductor lasers) are mounted in the light source section 11, alignment thereof could vary (mounting error could occur) to some extent. According to the present embodiment, in which no afocal system is used, the optical system in the light source apparatus 10 is unlikely to be affected by the mounting error that occurs in the multiple light emitters 40.

With reference back to FIG. 1, the homogenizing illumination system 13 includes a fly-eye lens 125, a fly-eye lens 130, a polarization conversion element 140, and a superimposing lens 150.

The polarization conversion element 140 aligns the polarization directions of the illumination light WL with one another. The polarization conversion element 140 is formed, for example, of a polarization separation film, a retardation film, and a mirror.

The superimposing lens 150 collects sub-light fluxes from the polarization conversion element 140 in such a way that they are superimposed on one another in the vicinity of an image formation area of each of the light modulators 400R, 400G, and 400B. The fly-eye lens 125, the fly-eye lens 130, and the superimposing lens 150 form an optical integration system that homogenizes the in-plane light intensity distribution of the illumination light WL.

As described above, according to the projector 1 of the present embodiment, which includes the light source apparatus 10, in which an increase in the size of the condensing optical systems is avoided, the size of the projector 1 can be reduced.

Second Embodiment

A light source apparatus according to a second embodiment will be subsequently described. In the following description, the same configurations and members as those in the first embodiment have the same reference characters, and detailed descriptions thereof will be omitted or simplified.

Figure 4:
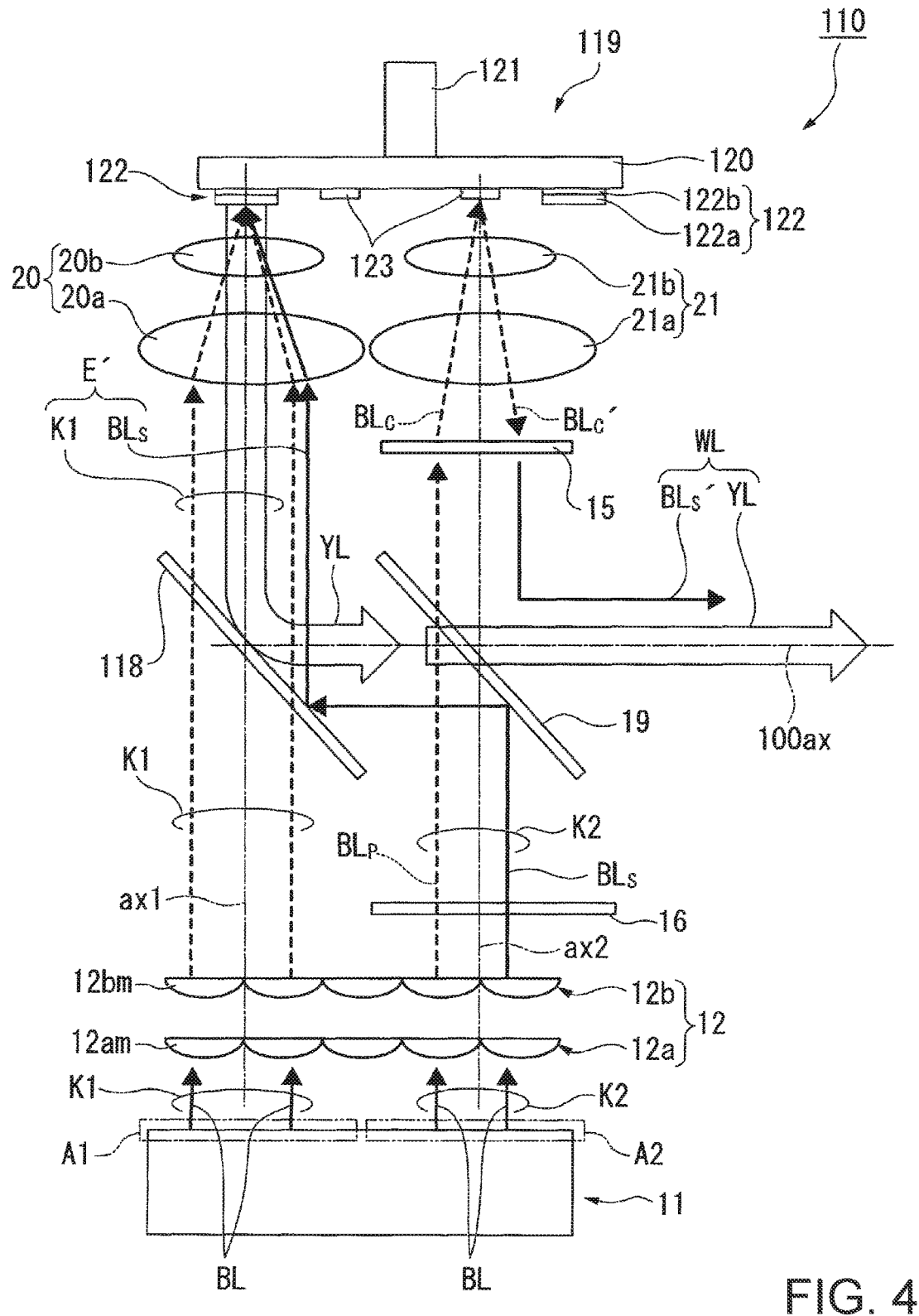
FIG. 4 shows a schematic configuration of a light source apparatus according to a second embodiment.

FIG. 4 shows a schematic configuration of a light source apparatus 110 according to the present embodiment.

The light source apparatus 110 includes the light source section 11, the homogenizer system 12, the first retardation film 15, the second retardation film 16, a first polarization separation element 118, the second polarization separation element 19, the first condensing optical system 20, the second condensing optical system 21, and a rotating wheel 119, as shown in FIG. 4. In the present embodiment, the rotating wheel 119 includes a phosphor element 122 and a diffusive reflection element 123. In the present embodiment, the first polarization separation element 118 corresponds to the "wavelength separation element" in the appended claims, the phosphor element 122 corresponds to the "wavelength conversion element" in the appended claims, and the diffusive reflection element 123 corresponds to the "reflection element" in the appended claims.

In the present embodiment, the first area A1 of the light source section 11, the homogenizer system 12, the first polarization separation element 118, the first condensing optical system 20, and the phosphor element 122 are sequentially arranged on the optical axis ax1.

The second area A2 of the light source section 11, the homogenizer system 12, the second retardation film 16, the second polarization separation element 19, the first retardation film 15, the second condensing optical system 21, and the diffusive reflection element 123 are sequentially arranged on the optical axis ax2.

The first polarization separation element 118 and the second polarization separation element 19 are sequentially arranged on the illumination optical axis 100ax.

The first light ray flux K1 having passed through the homogenizer system 12 is incident on the first polarization separation element 118. The first polarization separation element 118 has a polarization separation function for light (blue light) in the wavelength band which corresponds to the first light ray flux K1. In addition, the first polarization separation element 118 has a color separation function of reflecting the fluorescence YL irrespective of the polarization state thereof.

In the present embodiment, each of the light rays BL that form the first light ray flux K1 is linearly polarized light (P-polarized component with respect to first polarization separation element 118). The first light ray flux K1 therefore passes through the first polarization separation element 118 and travels toward the phosphor element 122. The first polarization separation element 118 reflects the light ray flux BLs formed of the S-polarized component reflected by the second polarization separation element 19, as will be described later.

The light ray flux BLs reflected by the second polarization separation element 19 is combined with the first light ray flux K1 having passed through the first polarization separation element 118 into excitation light E'.

The first condensing optical system 20 collects the excitation light E' and directs the collected excitation light E' toward the phosphor layer 33 on the rotating wheel 119. In the present embodiment, the phosphor layer 33 on the rotating wheel 119 is disposed at the focal point of the first condensing optical system 20.

In the present embodiment, the rotating wheel 119 includes a disc 120, a motor 121, which rotates and drives the disc 120, the phosphor element 122, which is provided on the disc 120 and shaped in the form of a ring, and the diffusive reflection element 123, which is provided on the disc 120 and shaped in the form of a ring. The phosphor element 122 is disposed in a position outside the diffusive reflection element 123 in the radial direction of the disc 120.

The disc 120 is formed, for example, of a metal member that excels in heat dissipation. The phosphor element 122 includes a phosphor layer 122*a* and a reflector 122*b*, which is provided between the disk 120 and the phosphor layer 122*a*.

On the basis of the configuration described above, the phosphor element 122 outputs the fluorescence YL produced by the phosphor layer 122*a* toward the first condensing optical system 20.

In the present embodiment, when the motor 121 rotates the disc 120, the position where the excitation light E' is incident on the phosphor layer 122*a* changes. As a result, degradation of the phosphor layer 122*a* due to incidence of the excitation light E' only on the same area can be avoided.

The fluorescence YL emitted from the phosphor layer 122*a* travels via the first condensing optical system 20 and the first polarization separation element 118 and passes through the second polarization separation element 19.

The S-polarized component (light ray flux BLs) of the second light ray flux K2 with respect to the second polarization separation element 19 is reflected by the second polarization separation element 19 and by the first polarization separation element 118 to produce, along with the first light ray flux K1, the excitation light E', as in the first embodiment. The P-polarized component (light ray flux BLp) of the second light ray flux K2 passes through the second polarization separation element 19 and the first retardation film 15 and is therefore incident as the light ray flux BLc on the second condensing optical system 21, as in the first embodiment. The light ray flux BLs corresponds to the "excitation component" in the appended claims.

The light ray flux BLc is collected by the second condensing optical system 21 on the diffusive reflection element 123. The diffusive reflection element 123 has the same configuration as that of the diffusive reflection element 23 in the first embodiment.

In the present embodiment, when the motor 121 rotates the disc 120, the position where the light ray flux BLc is incident on the diffusive reflection element 123 changes. As a result, degradation of the diffusive reflection element 123 due to incidence of the light ray flux BLc only on the same area can be avoided.

The circularly polarized light ray flux BLc' having reflected off the diffusive reflection element 123 and having passed through the second condensing optical system 21 again passes through the first retardation film 15 again, which converts the circularly polarized light ray flux BLc' into the S-polarized light ray flux BLs'. The S-polarized light ray flux BLs' (blue light) is reflected by the second polarization separation element 19 and combined with the fluorescence YL having passed through the second polarization separation element 19 into the white illumination light WL.

According to the light source apparatus 110 of the present embodiment, which includes the rotating wheels 119, which has the phosphor element 122 and the diffusive reflection element 123 provided on the disc 120, the first condensing optical system 20 and the second condensing optical system 21 can be disposed along the illumination optical axis 100*ax* (direction X). The size of the light source apparatus 110 in the direction X can therefore be reduced as compared with the configuration in the first embodiment.

The invention is not limited to the contents of the embodiments described above and can be changed as appropriate to the extent that the changes do not depart from the substance of the invention.

For example, in the embodiments described above, the case where the light exiting area of the single light source section 11 is divided into two areas (first area A1 and second area A2) and the first light ray flux K1 and the second light ray flux K2 are outputted from the areas is presented by way of example. Instead, a configuration in which two light source sections respectively emit the first light ray flux and the second light ray flux may be employed.

Further, in the embodiments described above, the case where the first polarization separation element 18 having the polarization separation function and the wavelength selection function is used to use part of the second light ray flux K2 as the excitation light E is presented by way of example. However, in a case where part of the second light ray flux K2 is not used as the excitation light E, the first polarization separation element 18 may be replaced with a dichroic mirror having only the wavelength selection function.

Further, in the embodiments described above, the projector 1 including the three light modulators 400R, 400G, and 400B is presented by way of example. The invention is also applicable to a projector that displays color images by using a single light modulator. Further, a digital mirror device may be used as each of the light modulators.

Further, in the embodiments described above, the light source apparatus according to any of the embodiments of the invention is used in a projector, but not necessarily. The light source apparatus according to any of the embodiments of the invention can be used also in a lighting apparatus, such as an automobile headlight.

The entire disclosure of Japanese Patent Application No. 2016-094521, filed on May 10, 2016 is expressly incorporated by reference herein.

What is claimed is:

1. A light source apparatus comprising:
a light source section including a plurality of light emitting devices and having a first area that outputs a first light ray flux and a second area that outputs a second light ray flux;
a wavelength separation element, a first condensing optical system, and a wavelength conversion element provided sequentially from the side where the light source section is present on an optical path of the first light ray flux; and
a wavelength selective polarization element, a first retardation element, a second condensing optical system, and a reflection element provided sequentially from the side where the light source section is present on an optical path of the second light ray flux,
wherein the second light ray flux reflected by the reflection element passes through the second condensing optical system and the first retardation element in an order thereof and is reflected by the wavelength selective polarization element,
fluorescence emitted from the wavelength conversion element enters the first condensing optical system, the wavelength separation element, and the wavelength selective polarization element in an order thereof,
the wavelength selective polarization element transmits the fluorescence irrespective of a polarization state of the fluorescence, and
the wavelength separation element is disposed in the optical path of the first light flux, and the wavelength selective polarization element is not disposed in the optical path of the first light flux.

2. The light source apparatus according to claim 1,
wherein the second light ray flux contains an excitation component reflected by the wavelength selective polarization element toward the wavelength separation element, and the wavelength separation element further has a polarization separation function for light in a wavelength band which corresponds to the first light ray flux, and combines the first light ray flux with the excitation component reflected by the wavelength selective polarization element.

3. The light source apparatus according to claim 2, further comprising a second retardation element provided on an optical path of the second light ray flux between the light source section and the wavelength selective polarization element,
wherein a direction of an optic axis of the second retardation element is changeable.

4. A projector comprising:
the light source apparatus according to claim 1;
a light modulator that modulates light from the light source apparatus in accordance with image information to form image light; and
a projection system that projects the image light.

5. A projector comprising:
the light source apparatus according to claim 2;
a light modulator that modulates light from the light source apparatus in accordance with image information to form image light; and
a projection system that projects the image light.

6. A projector comprising:
the light source apparatus according to claim 3;
a light modulator that modulates light from the light source apparatus in accordance with image information to form image light; and
a projection system that projects the image light.

7. The light source apparatus according to claim 1, wherein the first light flux does not reach the reflection element.

* * * * *